United States Patent

[11] 3,572,935

[72] Inventors William E. Howell
Yorktown;
Kazmere C. Romanczyk, Chesapeake, Va.
[21] Appl. No. 766,245
[22] Filed Oct. 9, 1968
[45] Patented Mar. 30, 1971
[73] Assignee The United States of America as represented by the Administrator of the National Aeronautics and Space Administration

[54] FRINGE COUNTER FOR INTERFEROMETERS
7 Claims, 6 Drawing Figs.
[52] U.S. Cl. .................................................... 356/106, 235/92
[51] Int. Cl. ................................................ G01b 9/02, G06f 7/38
[50] Field of Search ..................................... 356/106- -113; 235/92 (GC), 92 (66)

[56] References Cited
UNITED STATES PATENTS
3,409,375 11/1968 Hubbard ...................... 356/106
3,414,718 12/1968 McElroy ....................... 235/92(66)UX Primary Examiner—Ronald L. Wibert
Assistant Examiner—T. Major
Attorneys—William H. King, Howard J. Osborn and G. T. McCoy ABSTRACT: A device for counting fringes produced by an interferometer. An interferometer with a single photomultiplier is used to determine the magnitude and direction of motion of an object to a digital sensitivity of one-eighth of a wavelength. By an electronic squaring technique the digital sensitivity of the device can be increased to one-sixteenth or one thirty-second of a wavelength.

Patented March 30, 1971 3,572,935

INVENTORS
WILLIAM E. HOWELL
KAZMERE C. ROMANCZYK
BY
William H. King
ATTORNEYS

FRINGE COUNTER FOR INTERFEROMETERS

The invention described herein was made by employees of the United States Government and may be manufactured and used by or for the Government for governmental purposes without the payment of any royalties thereon or therefor.

The invention relates generally to a digital sensor and more specifically concerns a fringe counter for interferometers.

Interferometer technique utilizing lasers have been used in the past for determining the relative movement between two objects. These techniques produce fringes which are counted to give an indication of the relative movement. The counters used in the past to count interferometer fringes use two or more photomultiplier tubes which presents an alignment problem. Also the prior counters count whole fringes and do not directly count partial fringes. This limits the sensitivity of prior counters.

It is therefore an object of this invention to eliminate an alignment problem in interferometer fringe counters by using only one photomultiplier tube.

Another object of this invention is to improve the sensitivity of interferometer fringe counters.

A further object of this invention is to improve the sensitivity of digital sensors beyond their least significant bit resolution.

Other objects and advantages of this invention will become apparent hereinafter and in the drawings in which.

Figure 1:
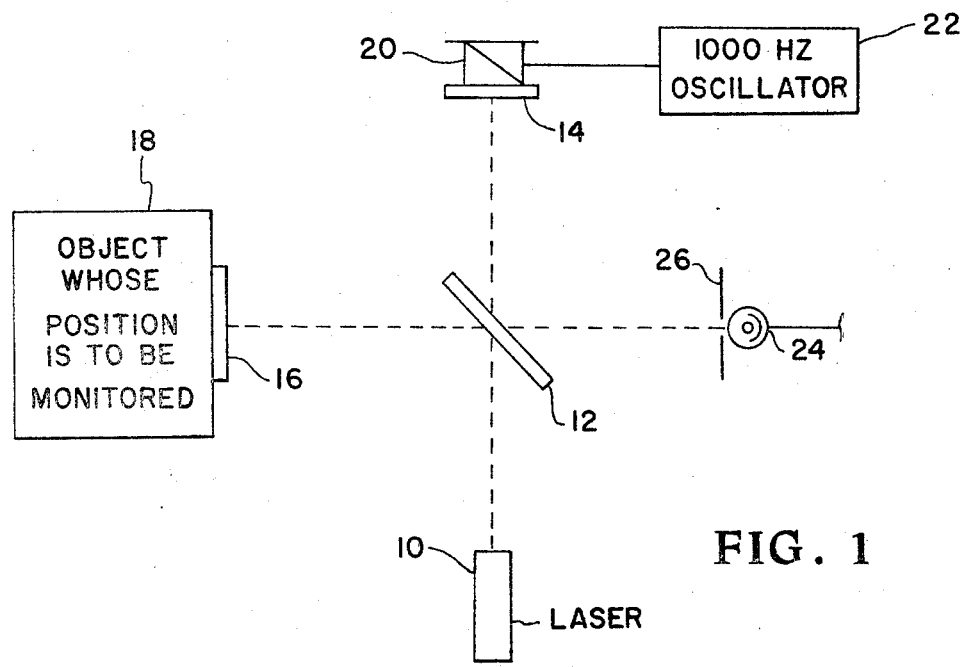
FIG. 1 is schematic drawing of an interferometer whose fringes are counted by the counter that constitutes the present invention.

While the technique used by this invention can be applied to most digital sensors, it can be best be understood by examining its application to a digital sensing interferometer. Consider the interferometer shown in FIG. 1. In most respects, it is fairly conventional, with a laser source 10, a beam splitter 12, a reference mirror 14, and a second mirror 16 attached to an object 18 whose position is to be monitored. The reference mirror 14 is mounted on a piezoelectric wafer 20 which is driven by a 1000 Hz. oscillator 22. The result is that the length of the reference arm is varied at a frequency of 1000 Hz. with the amplitude dependent upon the oscillator output. With a slight angle between the two mirrors, the output patterns is a set of fringes that oscillate across the face of the single photomultiplier tube 24 with an aperture 26 in front of it. This signal is processed by an electronics system to extract the amount and direction of motion of mirror 16. To understand the present invention requires some analysis of the photomultiplier tube 24 output. The intensity distribution for a fringe produced at the output of tube 24 is given by the familiar cosine-squared function.

$$I = 4a^2 \cos^2\left(\frac{2\pi d}{\lambda}\right) \quad (1)$$

where $I$ is the intensity at any point on the fringe (or the output of tube 24)

$a$ is a constant dependent on laser power output $d$ is the difference in path length between the reference and unknown paths, in wavelengths $\lambda$ is the wavelength of light Since the reference path length is being varied, $d$ is a function of time $$d = \frac{A}{4}\lambda \sin(\omega t)$$

where $A$ is the amplitude of piezoelectric oscillation in quarter wavelengths $\omega$ is the frequency of oscillation (6280 radians/sec)

Another factor which influences $d$ is the motion of mirror 16 from any initial setting. This can be represented by summing an unknown motion $k\lambda$ to the above equation giving $$d = \frac{A}{4}\lambda \sin(\omega t) + k\lambda \quad (2)$$

It is this unknown value $k$ which must be determined in both magnitude and direction. If the value for $d$ given in equation (2) is substituted into equation (1) and the identity $$\cos^2\theta = \tfrac{1}{2} + \tfrac{1}{2}\cos(2\theta) \quad (3)$$

is applied, the resultant is

Figure 2:
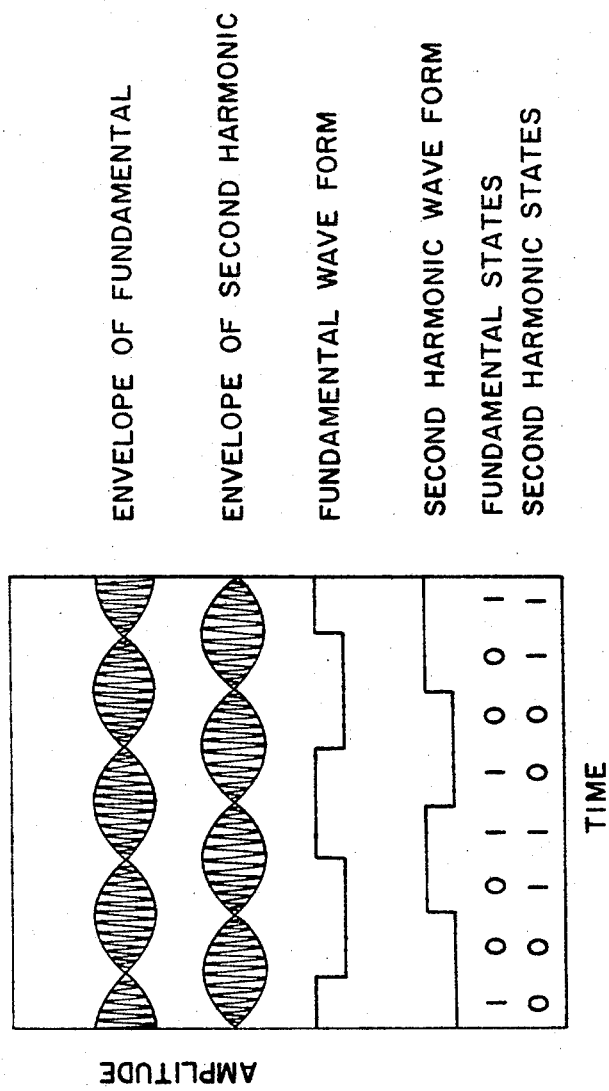
FIG. 2 is a drawing of the waveforms, logic and the fundamental and second harmonies of a fringe produced by the interferometer in FIG. 1.

Tube $24_{output} = P = 2a \cos A\pi \sin(\omega t) + 4\pi k \quad (4)$ applying a second identity $$\cos(\alpha + \beta) = \cos(\alpha)\cos(\beta) - \sin(\alpha)\sin(\beta) \quad (5)$$

to equation (4) gives $P_0 = 2a^2 2a^2 \cos(A\pi\sin(\omega t))\cos(4k)$
$\quad -\sin(A\pi\sin(\omega t))$
$\quad \sin(4\pi) \quad (6)$ Using the Bessel expansions $\cos(A\pi\sin(\omega t)) = J_0(A\pi) + 2J_2(A\pi)\cos(2\omega t) + 2J_4(A\pi)\cos(4\omega) + \ldots \quad (7)$ $\sin(A\pi\sin(\omega t)) = 2J_1(A\pi)\sin(\omega t) + 2J_3(A\pi)\sin(3t) + \ldots \quad (8)$ on equation (6) gives $P_0 = 2a^2 2a^2 J_0(A\pi)\cos(4\pi) \quad (9a)$
$\quad -4a^2 J_1(A\pi)\sin(4\pi k)\sin(\omega t) \quad (9b)$
$\quad -4a^2 J_3(A\pi)\sin(4\pi k)\sin(3\omega t) - \ldots \quad (9c)$
$\quad +4a^2 J_2(A\pi)\cos(4\pi k)\cos(2\omega t) \quad (9d)$
$\quad +4a^2 J_4(A\pi)\cos(4\pi k)\cos(4\omega t) + \ldots \quad (9e)$ Note the coefficients of the fundamental and second harmonic terms. The first consists of a constant term $(4a^2 J_1(A\pi))$ and a term of the form $\sin(4\pi k)$. Therefore, for every quarter wavelength traveled by the mirror 16, this term will assume values from zero to one and back to zero. Furthermore, as mirror 16 continues to move from one-quarter wavelength to one-half wavelength ($\tfrac{1}{4} \leq k \leq \tfrac{1}{2}$) this term will assume values from zero to minus one and back to zero. The total effect of this change is to vary the amplitude of the fundamental and its phase. Similarly the term $\cos(4\pi k)$ varies the amplitude and phase of the second harmonic. As an example of the way the system works, suppose mirror 16 is moved in one direction at a constant rate, then $k$ will be proportional to time. The amplitude and phase of the carrier will change as shown in FIG. 2. The top part of the drawing shows the envelope of the fundamental and the bottom part of the drawing shows that of the second harmonic. While it is impossible to simultaneously show the modulation envelope and the carrier phase, the carrier frequency at each succeeding maximum is opposite in phase to its predecessor. The same is true for the second harmonic. The remaining factor of importance is that the $\sin(4\pi k)$ and $\cos(4\pi k)$ terms are orthogonal functions, hence the envelopes of the two frequencies reach maximums at different values of $k$. This is shown graphically by FIG. 2. The second harmonic peak occurs at the valley of the fundamental and vice versa. By taking advantage of this fact and keeping track of how the phase of the carrier changes, each one-eight wavelength motion of the moving mirror can be detected and recorded. The electronic system which accomplishes this is shown in block diagram form in FIG. 3.

Figure 3:
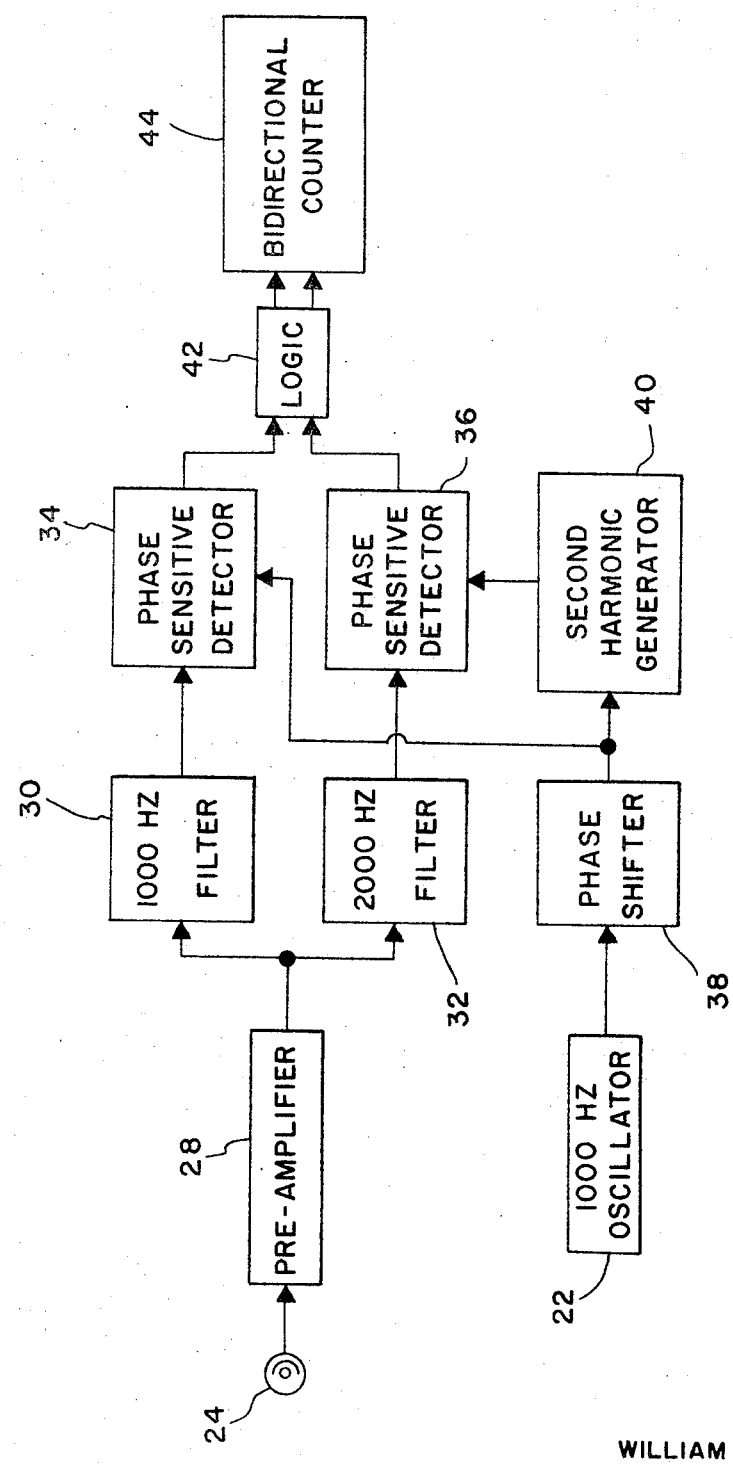
FIG. 3 is a block diagram of the fringe counter that constitutes the present invention.

Referring now to FIG. 3, the output of photomultiplier tube 24 is applied through a preamplifier 28 to a 1000 Hz. filter 30 and a 2000 Hz. filter 32. The outputs of filters 30 and 32 correspond, respectively, to the fundamental and second harmonic envelopes in FIG. 2. The outputs of filters 30 and 32 are applied to the inputs of phase sensitive detectors 34 and 36, respectively. The output of oscillator 22 has its phase shifted by a phase shifter 38 and then applied to phase sensitive detector 34. The output of phase shifter 38 is also applied to a second harmonic generator 40 whose output is applied to phase sensitive detector 36. The output of detector 34 is shown as the fundamental wave in FIG. 2 and the output of detector 36 is shown as the second harmonic waveform in FIG. 2. The waveforms at the outputs of detectors 34 and 36 are applied to a logic circuit 42 which produces a pulse each time there is a change in one of the two waveforms. If the change is from left to right, logic circuit 42 generates a pulse on one of its two outputs. We will say that the pulse is generated on the upper output of logic circuit 42 and call it an up pulse. If the change in one of the waveforms is from right to left a down pulse will be generated on the lower output of logic circuit 42. The pulses generated by logic circuit 42 are counted by a bidirectional counter 44. The count on counter 44 at any given time is indicative of the position of object 18 relative to its starting position. The filters, phase shifter, second harmonic generator and bidirectional counter are well known devices and will not be disclosed in detail in this specification. The phase sensitive detectors and logic circuit will be disclosed in more detail in the following paragraphs.

Figure 4:
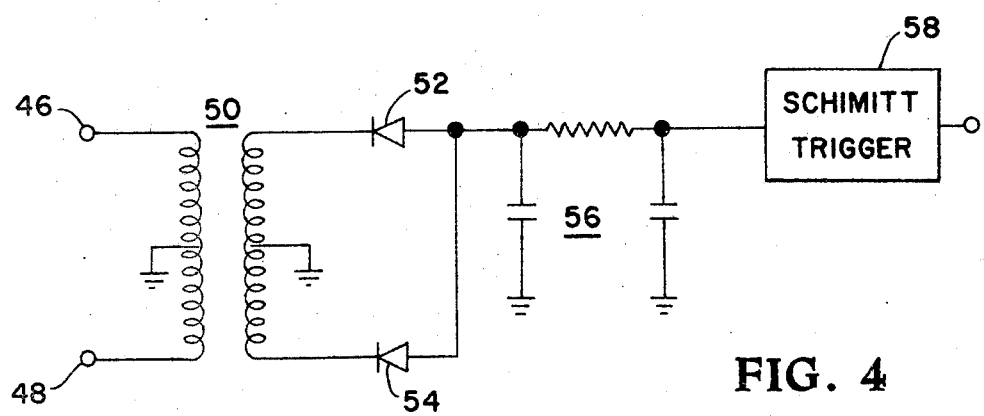
FIG. 4 is a schematic drawing of a detector that can be used as phase sensitive detectors 34 and 36 in FIG. 3.

A circuit suitable for use as phase sensitive detectors 34 and 36 are shown in FIG. 4. If used as detector 34 the output from filter 30 is applied to terminal 46 and the output from phase shifter 38 is applied to terminal 48. These outputs are applied across the primary of a transformer 50. If the two outputs are out of phase with each other there will not be any voltage induced in the secondary of transformer 50. However, if they are in phase a voltage is induced in the secondary which is rectified by diodes 52 and 54 and then smoothed by a filter 56. The output from filter 56 is applied to a Schmitt trigger 58 which produces the fundamental waveform.

Figure 5:
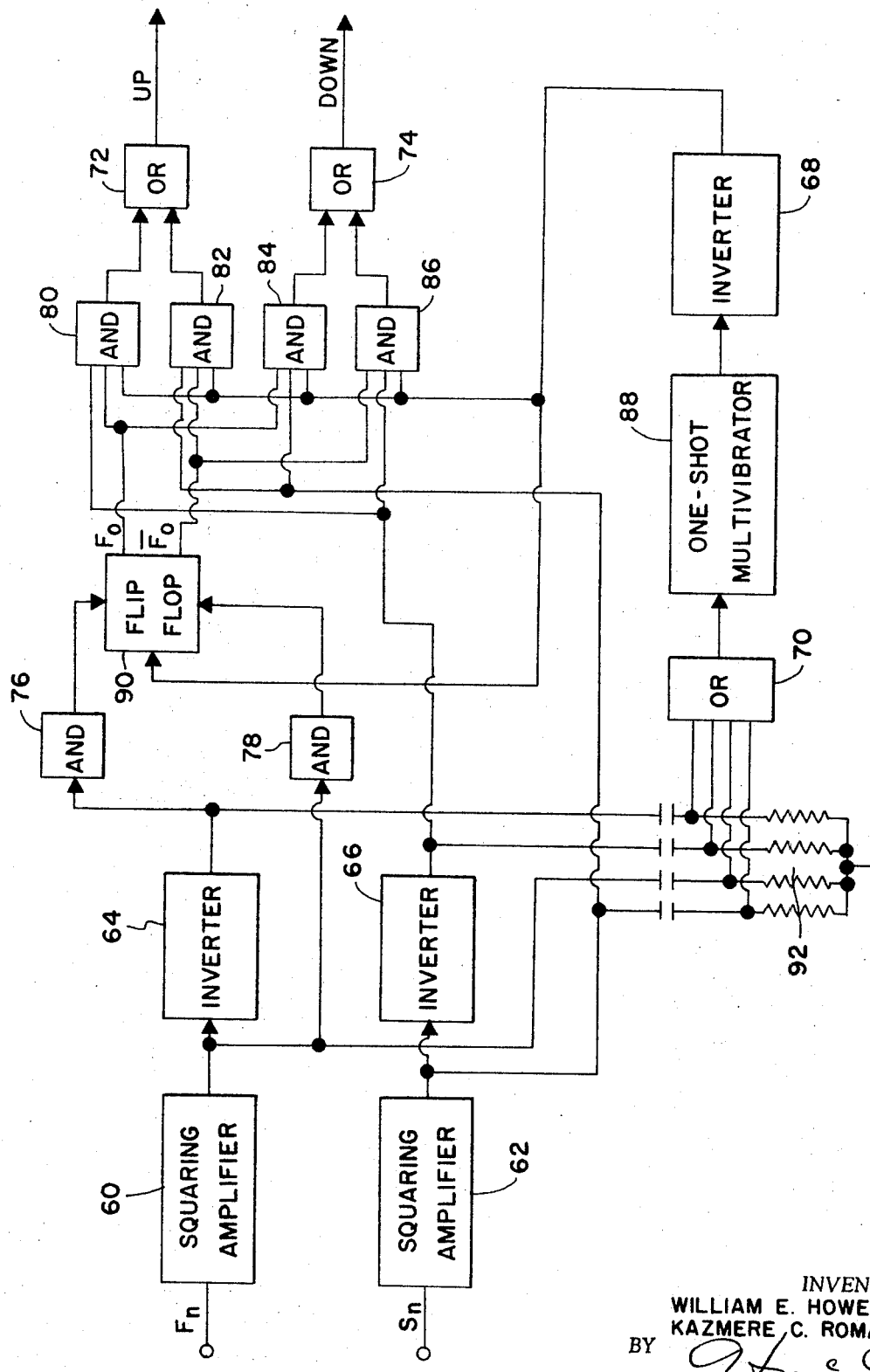
FIG. 5 is a block diagram of the logic circuit 42 in FIG. 3.

A circuit suitable for use as logic circuit 42 is shown in FIG. 5. This circuit consists of squaring amplifiers 60 and 62, inverters 64, 66 and 68, OR gates 70, 72 and 74, AND gates 76, 78, 80, 82, 84 and 86, one-shot multivibrator 88, flip-flop 90 and differentiating circuit 92 all interconnected as shown. The function performed by this circuit is described in the following Boolean equations:

UP=$SnFo+\overline{Sn}\overline{Fo}$
Down=$\overline{Sn}Fo+Sn\overline{Fo}$

That is, an up pulse is produced at the output of OR gate 72 if $SnFo$ is true or if $\overline{Sn}\overline{Fo}$ is true; and a down pulse is produced at the output of OR gate 74 if $\overline{Sn}Fo$ is true or if $Sn\overline{Fo}$ is true. $Sn$ is the state of the second harmonic waveform at any given instant and $Fo$ was the state of the fundamental waveform just prior to the last change of state of either the fundamental or second harmonic waveform. Suppose that the waveforms are changing from left to right (object 18 is moving in one direction) then if $Sn$ is 1 $Fo$ is 0 or if $Sn$ is 0 $Fo$ is 1. Now suppose the waveforms are changing from right to left (object 18 is moving in the other direction) then if $Sn$ is 1 $Fo$ is 1 and if $Sn$ is 0 $Fo$ is 0. The upper output of flip-flop 90 is $Fo$ and the lower output of flip-flop 90 is $\overline{Fo}$ To better understand how the logic circuit in FIG. 5 operates a specific example will be used. Referring to the logic at the bottom of FIG. 2, suppose that object 18 is moving such that a 1 is applied to the input of amplifier 60 and a 1 is applied to amplifier 62. We known that this logic will produce a pulse at one of the outputs. If object 18 is moving such that the waveforms are moving from left to right, $Fo$ is 1 and $\overline{Fo}$ is 0. This logic appears at the output of flip-flop 90. The output of amplifier 62 has a rising output which when applied to differentiating circuit 92 produces a sharp pulse which is applied through OR gate 70 to one-shot multivibrator 88. Multivibrator 88 produces a pulse which is inverted and applied to flip-flop 90 and AND gates 80, 82, 84 and 86. The output of amplifier 62 is also applied to AND gates 82 and 84. One can readily see that the only one of the AND gates that has a 1 applied to each of its three inputs is AND gate 82. Hence gate 82 produces a pulse that is applied through OR gate 72 as an up pulse. Hence as object 18 moves to cause the wave to move from left to right up pulses are produced. The purpose of inverter 64 and AND gates 76 and 78 is to store $Fo$ in the flip-flop for the next count. If the waveforms move from right to left down pulses are produced.

Figure 6:
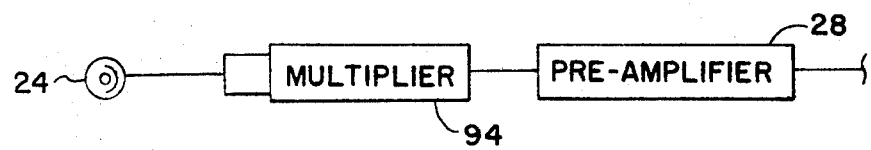
FIG. 6 is a modification of the invention to increase its sensitivity.

For most applications, the sensitivity of the device described in FIG. 3 is entirely sufficient. However, it is possible to significantly improve it. For example, the sensitivity would be doubled if the argument of the $\sin(4\pi k)$ term were doubled from 4 to 8. This can be accomplished if the output of photomultiplier tube 24 is electronically squared (multiplied by itself) yielding an equation of the form shown below. The equation is obtained by setting equation (4) equal to equation (9) and transposing the terms of equation (9a). This removes the DC terms of equation (4) and is accomplished electronically by the preamplifier 28 which passes only AC. The resultant equation in closed form is $P_0(AC)=2a^2[\cos(A\pi\sin(\omega t)+4\pi k)-J_0(A\pi)\cos(4\pi k)]$ The squared output $S^2$ is $S^2=4a^4\cos^2(A\pi\sin(\omega t)+4\pi k)-2J_0(A\pi)\cos(4\pi)$
$\cos(A\pi\sin(\omega t)+4\pi k)+J_0^2(A\pi)\cos^2(4\pi)]$ By applying equations (3) and (5) and
$\sin\Theta\cos\Theta=\tfrac{1}{2}\sin 2\Theta$
and the Bessel expansion (7) and (8), the output can be written, neglecting DC terms introduced by the squaring circuit as $S^2/4a^4=J_1(2A\pi)\sin(8\pi k)\sin(\omega t)-...$
$+2J_0(A\pi)J_1(A\pi)\sin(8k)\sin(\omega t)+...$
$+J_2(2A\pi)\cos(8\pi)\cos(2\omega)+...$
$-2J_0(A\pi)J_2(A\pi)\cos(8k)\cos(2\omega t)-...$
$-2J_0(A\pi)J_2(A\pi)\cos(2t)-...$ The fundamental and second harmonic now have coefficients involving $\sin(8\pi k)$ and the $\cos(8\pi k)$, respectively, which doubles the counting frequency or sensitivity of the system yielding a count every one-sixteenth wavelength of motion. In accordance with the above discussion the sensitivity of the system can be increased to yield a count every one-sixteenth wavelength of motion instead of every one-eighth wavelength of motion merely by placing a multiplier 94 between photomultiplier tube 24 and preamplifier 28 as shown in FIG. 6.

The advantages of this invention are obvious. An interferometer with a single detector is used to determine the magnitude and direction of motion of an object to a digital sensitivity of one-eight or one-sixteenth wavelength. Further, there is no obvious reason why the electronic squaring technique could not be used repeatedly to further increase the system sensitivity. For example, if the output of multiplier is applied to the two inputs of another multiplier the system sensitivity would be increased to one thiry-secondth wavelength

We claim:

1. A device for counting electrical fringes whose wavelength varies proportional to a variable comprising:
   means receiving said electrical fringes for producing the fundamental and second harmonic envelopes of said fringes;
   means receiving said fundamental envelopes for producing a first voltage level when the carrier in said fundamental envelopes is a first phase and for producing a second voltage level when the carrier in said fundamental envelopes is a second phase;
   means receiving said second harmonic envelopes for producing said first voltage level when the carrier in said second harmonic envelopes is said first phase and for producing said second voltage level when the carrier in said second harmonic envelopes is said second phase;
   logic circuit means receiving the outputs from the last two mentioned means for producing a pulse on the first of its two output terminals when there is a change in the output level of either of the last two mentioned means and the last change was one of two possible changes and for producing a pulse on the second of its two output terminals when there is a change in the output level of either of the two last mentioned means and the last change was the other of two possible changes; and
   a bidirectional counter for counting the pulses produced by said logic circuit means whereby the count on said bidirectional counter at any instant is indicative of the value of said variable at that instant.

2. A device for counting electrical fringes according to claim 1 wherein said second voltage level is ground potential.

3. A device for counting electrical fringes according to claim 1 including means for squaring said fringes before the fundamental and second harmonic envelopes are produced whereby the sensitivity of the counter is doubled.

4. A device for counting the fringes produced by an interferometer of the type that includes a laser source, a beam splitter, a reference mirror driven at a given frequency and a second mirror attached to the object whose position is to be monitored combined such that the fringes produced thereby oscillate across the face of a single photomultiplier tube comprising:

means connected to the output of said photomultiplier tube for producing the fundamental and second harmonic envelopes of said fringes;

means receiving said fundamental envelop for producing a first voltage level during alternate cycles of said fundamental envelope and for producing a second voltage level during the other alternate cycles of said fundamental envelope;

means receiving said second harmonic envelope for producing said first voltage level during alternate cycles of said second harmonic envelope and for producing said second voltage level during the other alternate cycles of said second harmonic envelope;

logic circuit means receiving the outputs from the last two mentioned means for producing a pulse on the first of its two output terminals when there is a change in the output level of either of the last two mentioned means and the last change was one of two changes and for producing a pulse on the second of its two output terminals when there is a change in output of either of the two last mentioned means and the last change was the other of two possible changes; and a bidirectional counter for counting the pulses produced by said logic circuit means whereby the count on said bidirectional counter at any instant is indicative of the position of said object at that instant.

5. A device for counting fringes in accordance with claim 4 wherein the two means for producing first and second voltage levels are both phase-sensitive detectors.

6. A device for counting fringes in accordance with claim 4 including means for squaring the output of said photomultiplier tube before it is applied to the remainder of the circuit whereby the sensitivity of the device is doubled.

7. A device for counting fringes in accordance with claim 4 wherein said logic circuit means includes circuitry for producing a pulse on its first output terminal when $SnFo+\overline{Sn}\overline{Fo}$ is true and includes circuitry for producing a pulse on its second output terminal when $\overline{Sn}Fo+Sn\overline{Fo}$ is true where $Sn$ is a logical 1 when said means receiving said second harmonic envelope produces said first voltage level and is a logical 0 when it produces said second voltage level and where $Fo$ is a logical 1 if just prior to the last change in voltage level of either the means receiving the fundamental or the means receiving the second harmonic, the means receiving the fundamental was producing said first voltage level and $Fo$ is a logical 0 if this means was producing said second voltage level.